United States Patent [19]
Swain

[11] 3,799,124
[45] Mar. 26, 1974

[54] HYDROGEN ENGINE AND METHOD OF FUELING SAME

[75] Inventor: Michael R. Swain, Miami, Fla.

[73] Assignee: Pollution Free Power Corp., Miami, Fla.

[22] Filed: May 5, 1972

[21] Appl. No.: 250,809

[52] U.S. Cl. ............. 123/1 A, 123/52 M, 123/120, 123/DIG. 12
[51] Int. Cl. ... F02m 21/02, F02b 1/08, F02b 43/10
[58] Field of Search ............ 123/1, 1 A, 39, 27 GE, 123/3, 119 E, 119, 32 ST, 127, 52 M, 139 AW, 120, DIG. 12

[56] References Cited
UNITED STATES PATENTS

| | | | |
|---|---|---|---|
| 3,703,886 | 11/1972 | Witzky | 123/32 ST X |
| 2,183,674 | 12/1939 | Erren | 123/119 E UX |
| 3,572,297 | 3/1971 | Murray | 123/1 A |
| 2,365,330 | 12/1944 | Carmichael | 123/3 X |
| 3,653,364 | 4/1972 | Bogan | 123/3 |
| 3,682,142 | 8/1972 | Newkirk | 123/3 |
| 3,710,770 | 1/1973 | Newkirk et al. | 123/120 |
| 3,648,668 | 3/1972 | Pacheco | 123/1 X |
| 3,425,399 | 2/1969 | Ward et al. | 123/27 GE X |
| 3,154,059 | 10/1964 | Witzky et al. | 123/32 ST UX |

*Primary Examiner*—Al Lawrence Smith
*Attorney, Agent, or Firm*—Fitch, Even, Tabin & Luedeka

[57] ABSTRACT

An internal combustion engine is fueled by hydrogen with the ratio of hydrogen to air within the combustion chamber or cylinder being varied to change the speed and power output of the engine and the flow of air to the engine is substantially unthrottled in contrast to the usual throttled flow of air and hydrocarbon fuel flowing from a carburetor to an engine. The preferred flow of hydrogen is substantially at ambient atmospheric pressure; and at light loads the hydrogen molecules may be concentrated within a portion of the chamber for combustion thereby burning a very lean charge of fuel. The engine and method of fueling provide higher thermal efficiencies, lower fuel consumptions and less pollutant emissions than similar engines fueled by a throttled flow of air-fuel mixtures, particularly hydrocarbon fuel-air mixtures.

14 Claims, 8 Drawing Figures

HYDROGEN ENGINE AND METHOD OF FUELING SAME

This invention relates generally to internal combustion engines and more particularly to an internal combustion engine fueled by hydrogen and to a method of fueling an internal combustion engine with a fuel mixture of hydrogen and air.

The reduction of air pollutants from internal combustion engines has been the subject of considerable study and investigation. Virtually all of the internal combustion engines in present use in automobiles employ a hydrocarbon, fossil fuel which exhausts hydrocarbons, nitric oxides, carbon dioxide and carbon monoxide. Because of the extent of pollution in the atmosphere from current engines, the U.S. Government has set new emission standards for automotive vehicle engines which require a considerable reduction in pollutants over the next several years.

Gasoline, in addition to being a source of numerous and substantial quantities of air pollutants from the exhaust of an automotive engine, requires an extensive carburetor system and a complex manifolding system to atomize the gasoline and distribute properly the atomized gasoline-air fuel mixture to each cylinder of the engine for various operating conditions including changes in demand for horsepower and speed without encountering preignition or backfiring problems. To control the speed and power, the gasoline-air fuel mixture is throttled extensively at the carburetor resulting in inefficiencies termed pumping losses herein. The tortuous manifold passages from the carburetor to the engine cylinders result in volumetric inefficiencies and these pumping losses coupled with the pumping losses due to throttling decrease the efficiencies of gasoline fueled automotive engines.

Although electric battery driven and various other engines have been suggested for powering automotive vehicles, the gasoline internal combustion engine has retained widespread usage in automobiles because of its ability to operate over a wide range of power demands and speeds, its quick response to demand for changes in power or in speed and because of its ability to be relatively inexpensively manufactured. Also, in addition to performance characteristics, the current gasoline engines have proven reliability coupled with a reasonable cost of operation. In short, current internal combustion engines used in automobiles will idle at light or no loads, will respond quickly to increases in demand for power, will accelerate a vehicle rapidly, will operate at light loads while cruising at high speeds and will run for substantially long periods of operation without having to stop for refueling. Regardless of what is done to develop substitutes for the internal combustion engine it is expected that at least 100 million more such engines will be built over the next 10 years, and the air we breath 10 years from now will depend to a large extent on how these engines are built and fueled.

The present invention is particularly directed to using the internal combustion engine because of its reliability and other proven qualities; and to adapting it to using hydrogen as a fuel for the twin purposes of reducing exhaust emissions therefrom as contrasted with exhaust emissions from gasoline fueled internal combustion engines and of providing a thermally more efficient engine. The hydrogen fueled engine and method disclosed herein will be described in connection with vehicles but the engine amd method of the invention may be used for purposes other than powering a vehicle.

In contrast to gasoline and other hydrocarbon fueled internal combustion engines hydrogen fueled engines will emit fewer pollutants with the substantial elimination of carbon monoxide and hydrocarbons; and with the efficiencies achieved with the new method of fueling the engine be more thermally efficient than a comparable gasoline fueled engine thereby resulting in fewer total polluting emissions per vehicle mile.

In contrast to a gasoline fueled internal combusion engine, water vapor, free $N_2$ and free $O_2$ are the principal constituents of the exhaust of the hydrogen fueled engine except, of course, when other fluids or gases are present as may result as a by-product of an on vehicle hydrogen generator or may be used for other purposes such as lowering nitric oxide emissions.

In accordance with a general object of the present invention, a new and improved hydrogen fueled internal combustion engine and method of fueling the same are provided.

These and other objects of the invention will become apparent from the following detailed description taken in connection with the accompanying drawings in which.

Figures 1, 2, 3:
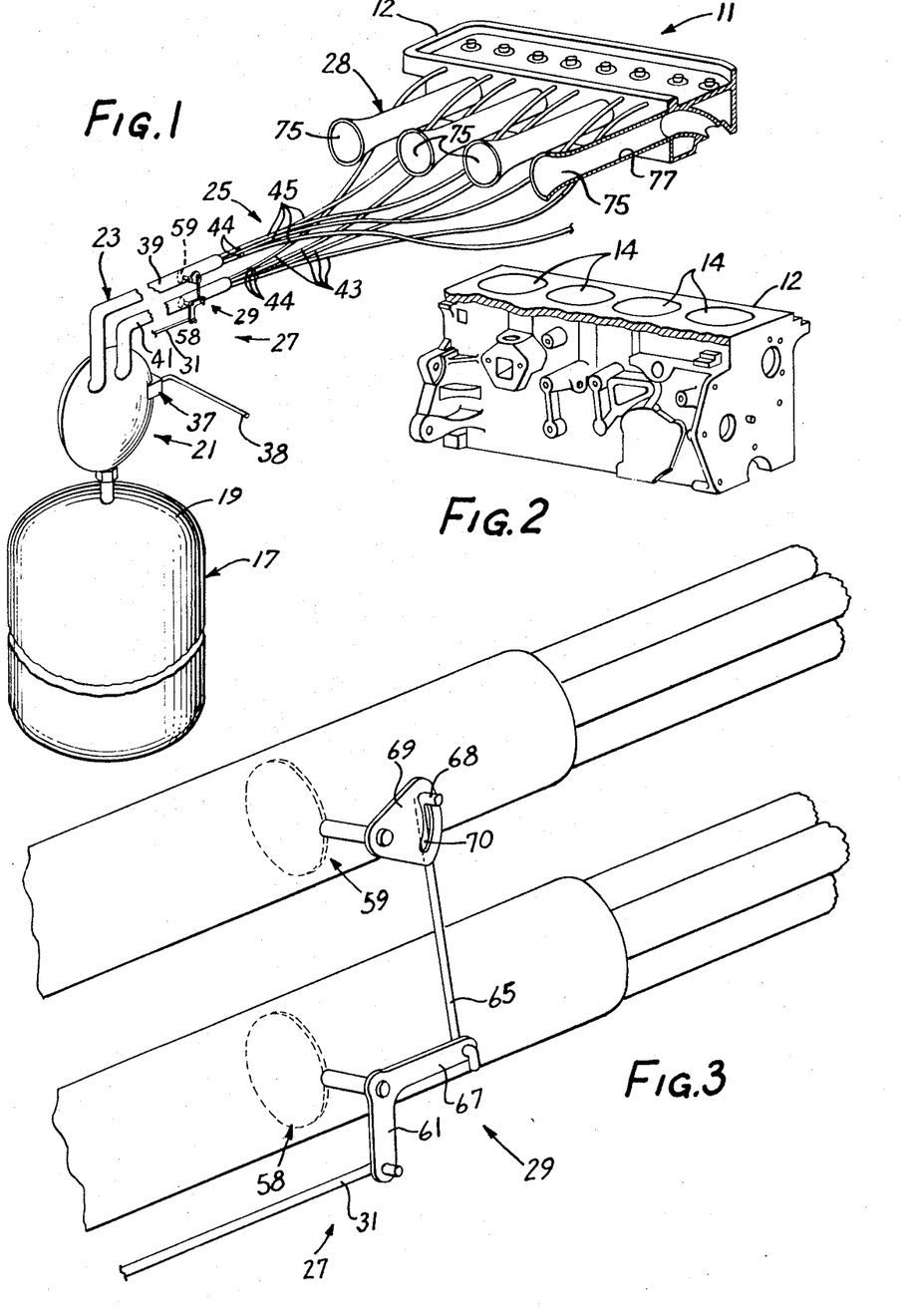
FIG. 1 is a fragmentary, illustrative view of a fueling system and engine embodying the present invention.
FIG. 2 is a perspective view of an engine cylinder block used for the invention illustrated in FIG. 1.
FIG. 3 is an enlarged diagrammatic view of a control means used to regulate the flow of hydrogen to the engine shown in FIG. 1.
Figure 4:
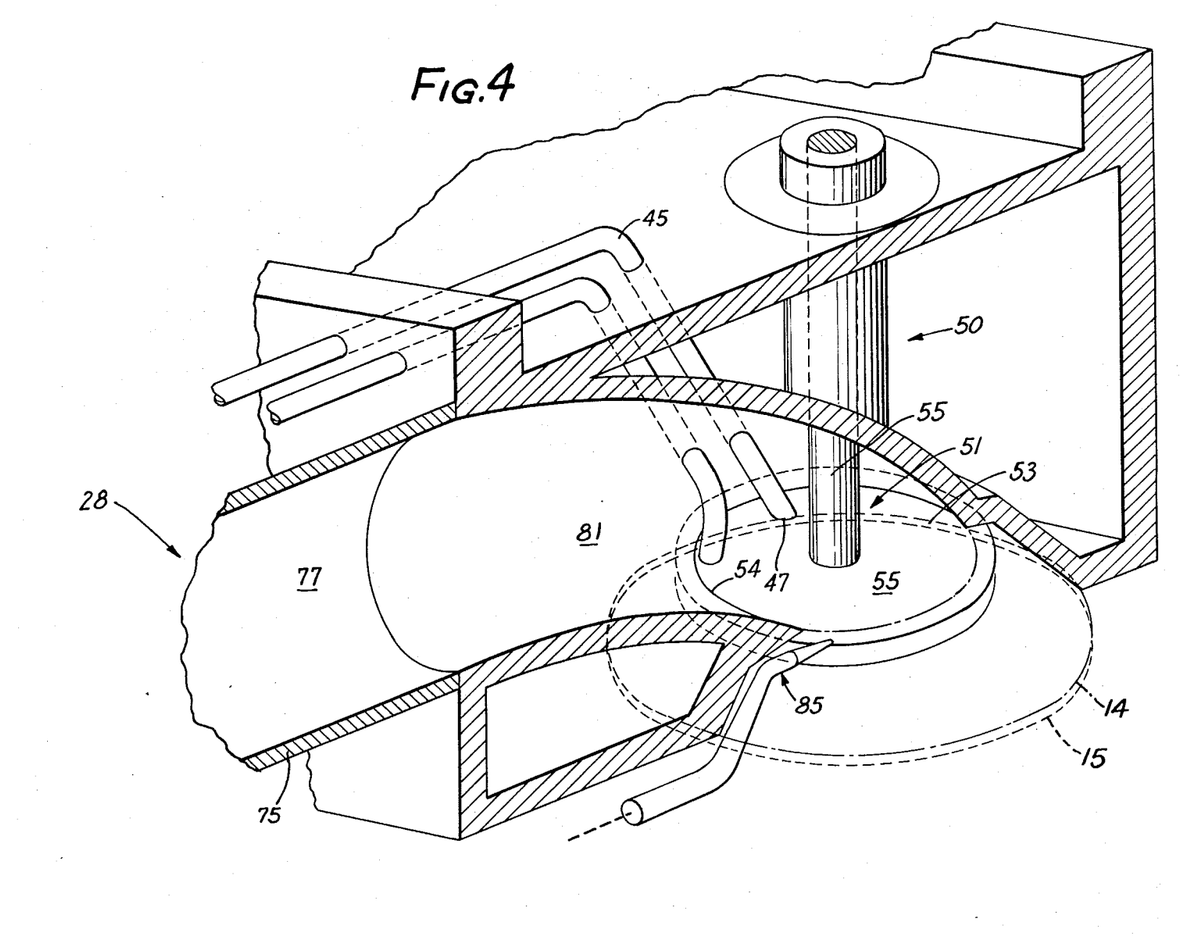
FIG. 4 is an enlarged view of an intake port to a combustion chamber and of separate passageways for air and hydrogen used in the engine shown in FIG. 1.

As shown in the drawings for purposes of illustration, the invention is embodied in an internal combustion engine 11 having a cylinder block 12 with a plurality of cylinders 14 therein. In a four-stroke cycle manner of operation pistons 15 (FIG. 4) in each cylinder 14 are reciprocated through an intake stroke, a compression stroke, a power stroke and an exhaust stroke. The engine 11 and its components, as best seen in FIGS. 1,2 and 4 may be of conventional design in common use in automobiles except as otherwise described herein; but the engine is fueled with hydrogen and is modified in a novel manner to operate, preferably without the use of carburetor in this illustrated and preferred embodiment of the invention. The engine 11 may have its cylinders arranged in a conventional and standard V form rather than in the straight vertical in line form shown in FIG. 2. Manifestly, the number of the cylinders, the bore size thereof, the valving arrangement, the stroke of the pistons, connecting rod length or cam shaft design may be varied considerably from that described herein while employing the principles of the invention.

The use of hydrogen as a fuel for internal combustion engines has been investigated heretobefore by other researchers. More specifically, early investigations by these researchers indicated that hydrogen-fuel air mixtures in internal combustion engines could produce suitable power, but these research efforts found that with hydrogen as a fuel there existed a tendency for the engine to knock and for the fuel to preignite unless low compression ratios and lean mixtures were used. Later experiments of others indicated that the knock and pre-ignition with a hydrogen-fuel mixture could be overcome at higher compression ratios provided that the combustion chambers were free of fluffy carbon deposits, the exhaust valve temperatures kept low, and low operating temperature spark plugs were used. However, the thermal efficiency results obtained by these other researchers when operating similar engines under similar operating conditions with gasoline or with hydrogen were not significantly different. While hydrogen-fueled, internal combustion engines have been investigated before; they have not been heretofore fueled and modified to achieve the efficiency as now obtained with the present invention.

In accordance with the preferred embodiment of the invention, very substantial improvements in thermal efficiency for an internal combustion engine are obtained with the use of a hydrogen fuel mixture rather than a hydrocarbon fuel such as gasoline and very improved emission results are obtained over the emissions obtained with gasoline fueled engines. The improved thermal efficiencies may be obtained by a fueling method which eliminates the carburetor and pumping losses associated therewith and by the use of very lean fuel-air ratios particularly when the engine is idling or at very light operating loads. In the preferred method of fueling, the ratio of hydrogen to air within the combustion chamber is varied to change the speed and power output of the engine in contrast to the usual throttling of the flow of the gasoline air mixture to change speed and power in the conventional gasoline engine. As will be explained in greater detail, advantage is taken of hydrogen's flame speed being faster than the flame speed of gasoline and hydrogen's wider range of ignition to allow the use of lean hydrogen to air ratios and to vary directly the flow of hydrogen in the combustion chambers to vary the engine's power and speed output. Also, as will be explained in greater detail, by admitting substantially unthrottled air flow into the cylinders 14 and by eliminating the tortuous manifolds and throttle plates of a carburetor, the pumping losses of the gasoline engine may be substantially reduced.

More specifically and in accordance with an important aspect of the invention, the engine 11 may be fueled at lighter loads in a manner to concentrate the lightweight molecules of hydrogen within a portion of each combustion chamber 14 to the extent that the ratio of hydrogen to air in each chamber may be actually less than that necessary for supporting combustion considering the volume of the combustion chamber as a whole. For example, it has been possible to convert a standard gasoline engine to use hydrogen gas and to swirl the gas in the center of the combustion chamber to achieve a very lean below 4.1 percent (by volume) of hydrogen to air in the fuel mixture being burnt; whereas, if the hydrogen were homogenuously dispersed within the entire volume of the combustion chamber, the percentage of hydrogen to air would have to be about at least 4.1 percent. Thus, at no or low loads, it is possible to stratify or concentrate the lightweight molecules of hydrogen to burn a very lean charge which results in a high thermal efficiency for the engine, lower fuel consumptions, and less pollutant emissions.

In the preferred fueling system, hydrogen is stored in a supply means 17, in this instance in the form of a metal cylinder 19 holding a compressed gaseous form of hydrogen at a pressure substantially higher than ambient atmospheric pressure. Hydrogen from the supply means 17 flows through a pressure regulator means 21 in which the pressure of the hydrogen is reduced substantially from the pressure at which the hydrogen is stored in the supply tank 19. In this instance, the pressure regulator means 21 reduces the pressure of hydrogen to the ambient atmosphere or slightly thereabove for flow through a conduit means 23 to an intake conduit means 25 leading to the cylinders 14.

In accordance with another important aspect of the invention, the engine 11 may be fueled with an induction technique without the use of a carburetor or without an expensive fuel injector system for spraying fuel into a combustion chamber while the air is compressed therein. As will be explained in greater detail, hydrogen at substantially atmospheric pressure may be inducted into the cylinders 14 during the intake stroke of the pistons 15 therein; and an unthrottled flow of air may be provided through an air inlet means 28 into the cylinders 14 during the intake strokes. By allowing unthrottled flow of air into the cylinders 14, the substantially low subatmospheric pressures experienced with carburetor fueled and throttled gasoline engines may be substantially eliminated. This relatively high vacuum on the combustion side of the pistons facilitates oil flow past the piston rings and the mixture of oil with the fuel thereby adding to the polluting emissions of a gasoline engine, particularly as the engine becomes older and the piston rings become worn.

With a free flow of air into the cylinders 14 during the intake stroke, the leaness or richness of the fuel mixture is controlled by a control means 27 for metering the flow of hydrogen to the cylinders 14 in response to movement of an actuator 31 which may be operated by an accelerator pedal (not shown) as in an automotive vehicle. The illustrated control means 27 is in the form of a valve means 29 which meters the flow of hydrogen to the cylinder intake conduit means 25. As will be explained, when the engine is idling the valve means permits a predetermined, low flow rate of hydrogen through the conduit means 25; whereas with increased demand as by an operation of the actuator 31, the valve means will open further and permits a larger flow rate of hydrogen through the intake conduit means 25 and into the cylinders to increase the percentage of fuel in the cylinders 14. As the air intake means 28 is open and unthrottled, the percent of air in the cylinders varies inversely and proportionally to the percentage of hydrogen fuel being admitted into the cylinders. An additional advantage of this method is that the intake manifolding does not contain explosive mixtures of hydrogen and oxidant; this minimizes the hazards associated with backfiring.

Referring now in greater detail to the illustrated hydrogen engine 11 and to the preferred manner of fueling the same, the engine 11 is modified to advantageously capitalize on the attributes of hydrogen, particularly as contrasted with gasoline as a fuel for an internal combustion engine.

More specifically, hydrogen has a flame speed faster than gasoline and has a good flame speed over a range of fuel air ratios larger than gasoline-air fuel ratios. As used herein the term hydrogen refers to a gas or gas mixture which is largely dependent on the formation of oxygen-hydrogen bonds for the production at available energy to do work. This gas then may contain percentages of other gases which are either the by-products of an on board hydrogen generation source, constituents added to reduce nitorgen oxides emissions or increase octane number. One of the shortcomings of gasoline is that it will not support a sufficiently fast flame speed for use in internal combustion engines over very low gasoline-air ratios as will hydrogen. Additionally, hydrogen has a faster flame speed and burns over a wider range of fuel-air ratios, e.g., about 4.1 percent to 74 percent hydrogen to air by volume, than hydrocarbon fuels such as methane, ethane, ethylene and acetylene. This flame speed characteristic of hydrogen at the lean side of air-fuel ratios is advantageously used herein, e.g., for a 1971 Toyota 1600 an 8 percent hydrogen-air fuel ratio is used at cruising speed for an automotive vehicle and below 4.1 percent hydrogen to air fuel ratio may be used for idling. With the engine 11 illustrated, the maximum fuel ratio of hydrogen-air is about 31.3 percent hydrogen for maximum power.

Although the hydrogen is illustrated as being stored in a compressed gaseous state in a cylinder 19, the induction system of the present invention is particularly adaptable for use with hydrogen generated at low or near ambient atmospheric pressure. Hence, this invention may be used to eliminate the drawbacks of a need for high pressure fuel tanks and fuel supply stations therefor. For instance, hydrogen may be stored at low pressure by a hydride, such as magnesium-nickel or magnesium-copper hydride, from which it is thought that hydrogen may be recovered economically, safely and in sufficient quantities to provide a long-range fuel supply comparable to the range achieved with present day gasoline storage tanks on automobile engines. Of course, liquid hydrogen could be stored and evaporated to supply the hydrogen introduced into the combustion chambers. In addition, a number of chemical reactions release hydrogen (oxidation of ferrous metals, aluminum, calcium hydride, etc.) which may provide a suitable source for fueling a hydrogen powered vehicle. In addition, hydrogen can be generated on the vehicle by the reaction of water and a hydrocarbon fuel such as gasoline, kerosene, etc., the resulting fuel being a mixture of mainly hydrogen gas and carbon dioxide. The gaseous by-products from the hydrogen gas generating process may also be passed through the engine before being exhausted.

The operator of the hydrogen engine 11 may be provided with means for providing responsiveness of the hydrogen engine to demands for increased speed or power by providing the control means 27 with a flow rate increase means 37 which, in this instance, increases the flow rate by increasing the pressure of gaseous hydrogen in the conduit means 23 and consequently an increase in flow rate of hydrogen past the valve means 29 and into the cylinder 14. For instance, the flow rate means 37 may be operated in response to a manual movement of the vehicle operator such as through an actuator 38 in the form of a control rod connected to the pressure regulating means 21 to reset the level of its output pressure to a higher level whereby an output of hydrogen gas at a higher pressure than the normal pressure is obtained across the pressure regulating means 21. The increase in hydrogen pressure is transmitted almost instantaneously, i.e., at about the speed of sound through the conduit means 23 which is very high in hydrogen gas, to the valve means 29 and if the latter is open, an increased pressure through the intake conduit means 25 results in an increased flow rate of hydrogen to the cylinders 14 than would be realized had the pressure remained substantially constant. Thus, by the combination of the metering of the valve opening and the pressure of the gas flowing through the intake conduit means 25 the hydrogen engine can be made particularly responsive to demands for increased speed or load.

The illustrated conduit 23 is in the form of a primary hydrogen flow conduit or pipe 41 and a secondary hydrogen flow conduit or pipe 39 each which extends from the outlet of the pressure regulating means 21 to the control valve means 29. The fuel supply means 17 may be at a remote location as is the usual gasoline supply tank. In this instance, hydrogen flows through the pipe 41 during heavy power or speed demands and hydrogen flows through the pipe 39 only at light loads. The illustrated intake conduit means 25 has an assembly of primary induction tubes 43 connected in fluid communication with the primary pipe 41 and extending to each cylinder 14. Likewise, an assembly of secondary induction tubes 45 are each connected to one of the combustion chambers 14 to admit hydrogen to each chamber with proper operation of the control valve means 27. The secondary induction tubes 45 are, as best seen in FIG. 2, provided with outlets 47 which discharge generally at the center of each cylinder 14 and in a manner to swirl the hydrogen to form the stratified concentrated charge at the center of the chamber. On the other hand, for the heavier power and speed demands, the primary induction tubes 43 deliver to the sides of the combustion chambers a richer mixture of hydrogen in excess of the 4.1 percent hydrogen to air. The flow and distribution of hydrogen to each of the cylinders may be regulated by a flow control means to compensate for different path lengths and curves in the intake tubes. The flow control means may take various forms such as an adjustment screw 44 projecting into each tube 43 and 45 for turning to open or restrict gas flow therethrough.

The particular shape, number and operation of an intake valve means 51 may be varied considerably for a number of considerations such as efficiencies of flow, ease of manufacturing, etc. For purposes of illustration only, the intake valve means 50 comprises a single valve means 50 comprising a single valve member 53 for each cylinder 14 movable by a suitable actuator 55 between a lowered open position in which hydrogen and air may flow through an intake port 54 into the cylinder 14 and an upper closed position in which a back or upper surface 55 of the valve member 53 abuts and covers the outlets of the hydrogen intake tubes 43 and 45. With closure of the valve member 53, the intake port is also closed to the air intake means 28.

When using two separate sets of intake tubes 43 and 45 and only a single intake valve member 53 for each cylinder 14, the valve means 29 controls which set of the intake tubes 43 and 45 will be open to hydrogen flow therethrough. The valve means 29 accomplishes this flow control by having a primary valve 58 and a secondary valve 59 each controlling flow through its respective primary and secondary pipes 39 and 41 to the respective manifold sets of intake tubes 43 and 45. preferably, the valves 58 and 59 are operated by a common operating means 69 which, in turn, is operated by the actuator 31 which is connected to the vehicle accelerator. With operation at loads and speeds substantially above idling loads and cruise, the valve 58 opens and meters the flow rate of hydrogen through the intake induction tubes 43 to discharge hydrogen in the cylinders 14 near the cylinder walls thereof, and if necessary destroys the induction swirl. With pulling of the actuator 31 in the direction of the arrow, it pulls on an attached bell crank 61 to turn it in a clockwise direction, as viewed in FIG. 1, to operate its internal valve member (not shown) for example, a butterfly valve member to open the same to the extent of turning of the bell crank. A link 65 is attached to an arm 67 of the bell crank and the link has a lost motion connection with a valve operator cam 69 for the valve 59. More particularly, the lost motion connection comprises a hook 68 on the link inserted into a curved slot 70 in the operator cam 69. The hook 68 will travel freely in the curved slot until abutting the end of the slot after which continued turning of the bell crank in the same direction turns the operator cam 69 to reposition the valve member between open and closed positions. The actuator 31 will, as by spring pressure, with release of the accelerator pedal, return the bell crank 61 to the illustrated position blocking hydrogen flow through the intake tubes 43 while the other valve member is in an open position allowing hydrogen to flow through the intake induction pipes 45 to discharge at the outlets 47 adjacent the center of the combustion chambers.

It is to be understood that the intake conduit means 23 may comprise only a single conduit or pipe rather than the illustrated plurality of pipes 39 and 41. Also, the intake means 25 may comprise only a single set of intake tubes, one for each cylinder rather than two tubes 43 and 45 illustrated for each cylinder. In such event, the valve means 29 may comprise only a single valve. It will be appreciated that the intake conduit means 23, control means 27, and air intake means may take various other forms to provide the method of fueling with hydrogen herein described and claimed.

Additionally, the concentration of the lightweight hydrogen molecules may be obtained in various manners by the use of various means, e.g., directional ports, flow diverting vanes, fins above the intake valve, or spiral or snail shaped ports, partially recessed valve seats, quench areas producing swirls or shrouded valves. Various other means may be used to direct the flow to provide the concentrated charge for combustion when the overall hydrogen is below 4.1 percent of the total combustion chamber volume. Moreover, it is possible to provide a premixing chamber in which the hydrogen and air would be mixed prior to introduction into the combustion chambers.

For the purpose of providing the substantially unthrottled flow of air and to avoid the pumping losses and inefficiencies in fluid flow found with tortuous manifolds and carburetor of gasoline engines, it is preferred that the air be conveyed through the air intake means 28 which is in the form of substantially straight flow pipes 75 having a substantially straight and smooth flow directing wall 77 extending from an air inlet end 79 to an air discharge end 81 located adjacent or at the intake valve 53. Thus, with air being taken in on the intake stroke and through a wide cross-sectional bore of generally non-tortuous configuration, the pressure experienced within each cylinder during an intake stroke should be near the atmospheric ambient pressure rather than substantially below ambient atmospheric pressure heretofore experienced with gasoline engines during the intake strokes thereof. These high pressure differentials in gasoline engines cause oil to migrate past the piston rings into the combustion chambers; and they also cause large pumping losses and inefficiencies. It has been found that the pumping losses can be reduced with the present hydrogen induction system and that the brake thermal efficiency may be increased by as much as 48 percent. The separate air intake pipes 75 may be connected to a common air filter (not shown) or have individual filters to trap dirt and other foreign matter from flowing with the air into the cylinder.

A combustion ignition means such as a Champion N60R spark plug is provided to ignite the hydrogen-air fuel mixture. The ignition occurs during the compression stroke or the first 50° of the power stroke and time of ignition is dependent on the air-fuel ratio, load, speed, etc. Due to reasonably low minimum spark ignition energy requirements stock ignition systems may be used. To avoid the fluffy carbon deposits and the preignition problems associated therewith in the hydrogen engine 11, special lubricating oils may be used such as, for example, a parafin based oil or a silicone or synthetic based lubricant. Also, it is preferable to use a low-operating temperature spark plug such as Champion N60R for the hydrogen engine 11 to avoid preignition problems heretofore found when using the usual standard temperature gasoline engine spark plugs.

While the engine 11 described is a four-cycle engine, the hydrogen engine 11 may be a two-cycle engine having its intake, compression, power and exhaust processes achieved within two strokes of the engine. The engine will be described in connection with the use of free air from the ambient atmosphere to supply the oxidant; but the engine may be operated with pure oxygen from a storage tank in other environments, e.g., in a submarine environment, and the exhaust of the engine will be substantially water.

Principles of the present invention have been tested on a vehicle originally powered with a gasoline internal combustion engine but converted to use hydrogen as a fuel. This engine was successfully operated with hydrogen with only one intake conduit for hydrogen per cylinder.

When the hydrogen engine 11 is built as original equipment for vehicles a number of other changes may be made advantageously. For instance, because the flame speed of hydrogen is faster than the flame speed of gasoline, the bore to stroke ratio for the engine may be changed and larger cylinder bores may be used to reduce the amount of friction losses now being experienced with gasoline internal combustion engines. Also, because of the faster flame speed for hydrogen, hydrogen engines embodying the invention may be provided with a reduced fuel burning time loss as contrasted with present gasoline internal combustion engines for automobiles. In lieu of using sodium filled exhaust valves to reduce the temperature thereof, two smaller exhaust valves may be used rather than one large exhaust valve. Also, with larger intake valve capacity and larger exhaust valve capacity, the hydrogen engine may be operated at a higher efficiency. Also, the control means 27 could be in the form of fluid amplifiers to control and direct hydrogen to the proper cylinder or in the form of rotary valves, or spool valves as part of the valve stem-valve guide assembly, or orifice at valve seat 85.

As the hydrogen fueled engine 11 has no gasoline atomization problems and may eliminate therefrom complex manifolding passageways, water may be more easily injected into the hydrogen-air fuel mixture than into a gasoline-air fuel mixture. The water injection will maintain a lower temperature in the combusion chamber thereby reducing the nitric oxides in the exhaust gas of the hydrogen engine. The gases exiting the exhaust valve and port may be recirculated into the combusion chamber for the same purpose.

Figure 8:
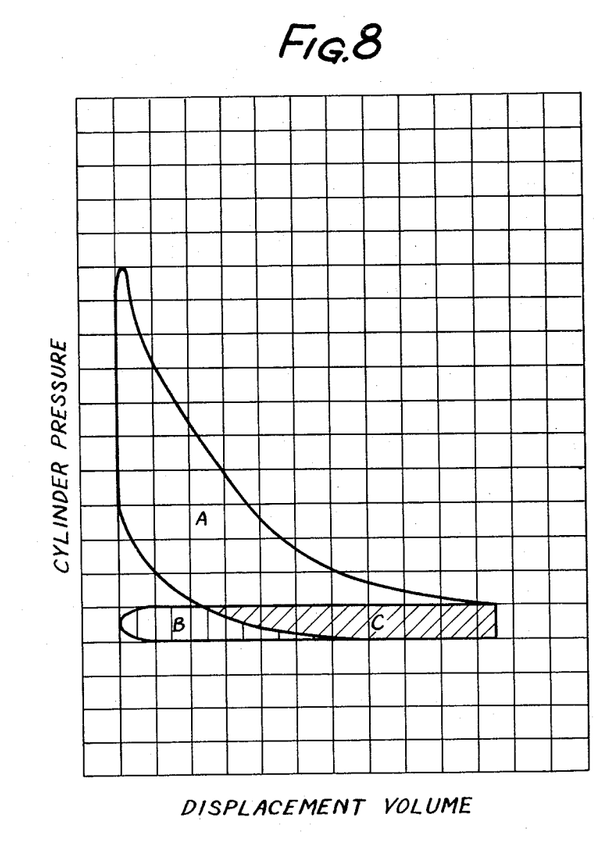
FIG. 8 illustrates an indicator card for an engine.

Power measurements of an engine may be made by means of indicator cards which illustrate pressure-volume measurements as best seen in FIG. 8. Pressure-volume measurements from such indicator cards may be used, as will be explained, to distinguish in quantitive terms a "substantially unthrottled" system of a hydrogen engine in accordance with this invention from a throttled system used in a conventional gasoline or fossil fueled engine. Herein, a substantially unthrottled engine may be quantitively defined as being when $PMEP/IMEP < 2/X2$ where $PMEP$ is Pumping Mean Effective Pressure; where $IMEP$ is Indicated Mean Effective Pressure and where $$X = (IMEP \text{ (part load)}/IMEP \text{ (full load)}).$$

For a given engine, the IMEP is calculated from a pressure-volume indicator card such as the indicator card, curve 100 FIG. 8. IMEP is equal to the sum of area A and area C. The PMEP is calculated as the sum of area B and area C shown in FIG. 8. The area A is indicative of the pressure-volume measurement for the compression and power strokes. The areas B and C are indicative of the pressure-volume measurement for the intake and exhaust strokes. Of course, with various operating conditions and parameters for various engines, the respective areas will vary in size and shape.

Figure 6:
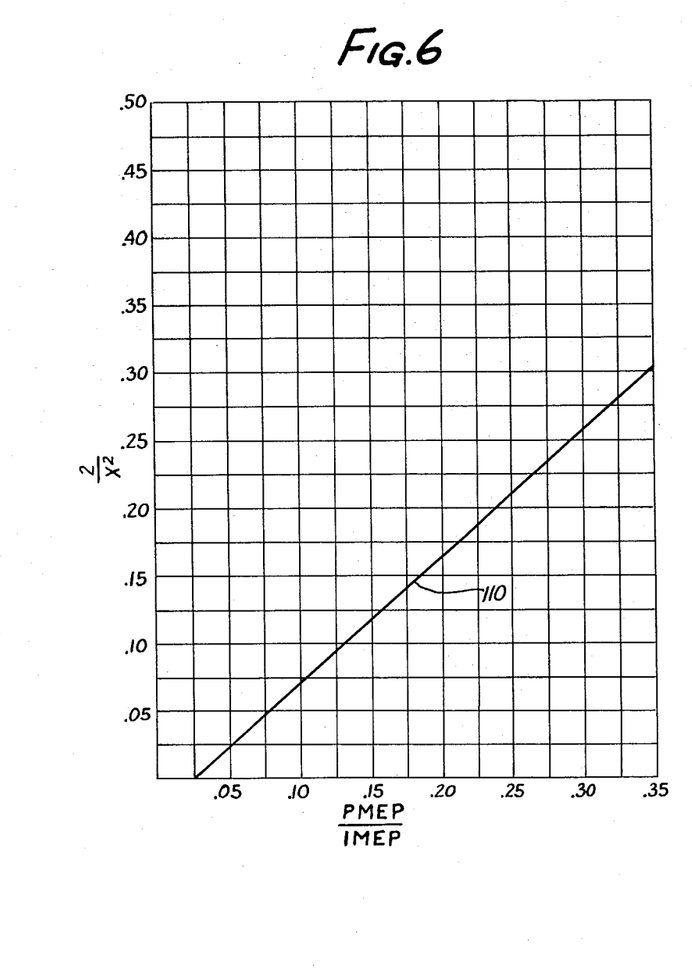

In a "substantially throttled" engine as defined herein the ratio of Pumping Mean Effective Pressure to Indicated Mean Effective Pressure will be less than $2/X2$, and beneath the curve 110, shown in FIG. 6. The valves used to plot the graph shown in FIG. 6 are as follows:

TABLE I

| $\dfrac{IMEP^1}{IMEP^2}$ | 1.00 | 0.615 | 0.46 | 0.307 | 0.231 |
|---|---|---|---|---|---|
| $\dfrac{PMEP}{IMEP}$ | 0.02 | 0.07 | 0.13 | 0.25 | 0.45 |
| $\dfrac{2}{X2}$ | 0.02 | 0.0528 | 0.0944 | 0.212 | 0.375 |

[1] Partial.  [2] Max.

FIG. 6 illustrates in quantitive form that the hydrogen engine will have volumes below the curve 110 whereas the throttled engines will have values above the line 110.

Figure 5:
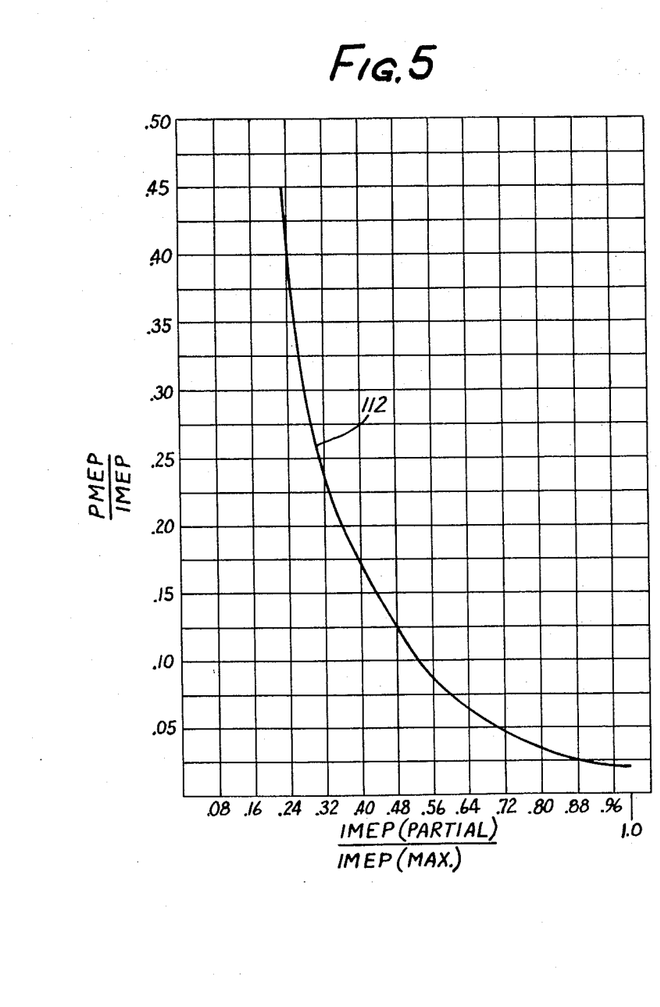
FIGS. 5, 6 and 7 are curves to illustrate engine performance.

A curve 112 graphed in FIG. 5 illustrates the ratio of Pumping Mean Effective Pressure to Indicated Mean Effective Pressure as plotted against the ratio of Indicated Mean Effective Pressure at part load to Indicated Mean Effective Pressure for a full load for the values given in Table I.

Figure 7:
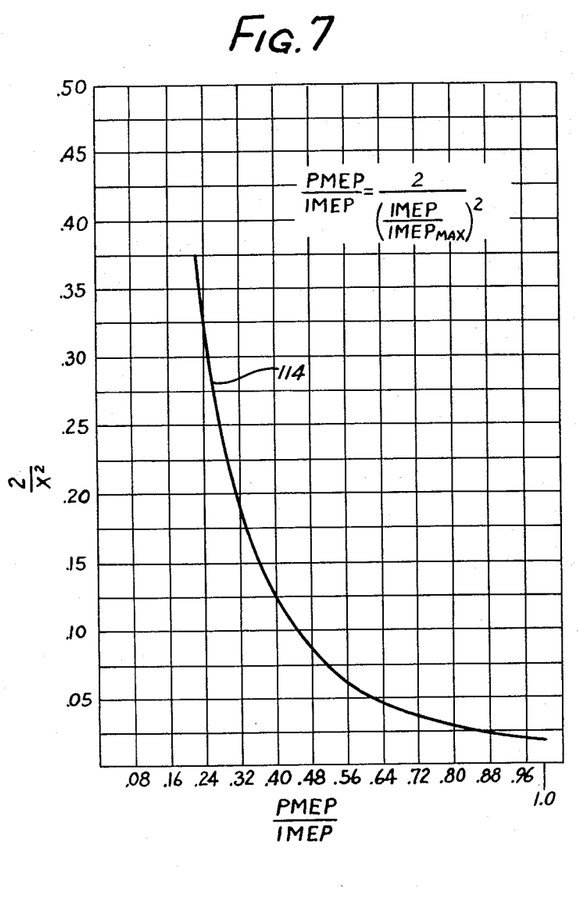

A curve 114 in FIG. 7 also plots the data disclosed in Table I with the values for $2/X2$ along the ordinate and for $IMEP$ (partial)/$IMEP$ (max) along the abscissa.

From the foregoing, it will be seen that the present invention provides a hydrogen engine operable to provide a substantial reduction in contaminants in its exhaust in contrast to present day commercial automobile gasoline engines. By use of the hydrogen induction fueling method, increased thermal efficiency as compared to a gasoline engine for a vehicle may be achieved. Also, the present invention may be employed by modifying gasoline internal combustion engines to retain the proven reliability, wide power and speed range characteristics thereof yet with better efficiency and with better exhaust emissions.

The internal combustion engine 11 illustrated in the drawings having reciprocating pistons in cylindrical chambers 14 is only illustrative of the present invention as the present invention also encompasses internal combustion engines of the rotary kind, e.g., the Wankel engine, in which a rotary piston or rotor rather than a reciprocating piston is used as the member driven by the burning of the fuel in a non-cylindrically shaped chamber. In a rotary internal combustion engine, hydrogen may be induced to flow into the rotary piston chamber through the intake conduit means 25 with the natural motion of the rotary piston acting as a valving mechanism for controlling the flow of hydrogen, air and exhaust gas into or from the chamber 14. Thus, it will be understood that the terms "piston", "chamber" and "member driven by an increase in fluid pressure with burning of the fuel" are generic to such elements in either a rotary or reciprocating kind of internal combustion engine.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A method of fueling an internal combustion engine with a hydrogen-air fuel mixture for ignition by a spark igniting means in a chamber with a member therein driven by an increase in fluid pressure with burning of the fuel, said method comprising the steps of controlling the flow rate of hydrogen flowing to said chamber, inducing the flow of hydrogen into said chamber during an air intake movement of said member in said engine, conveying a substantially unthrottled flow of air and combining the same with said hydrogen during the intake movement of said member to form an ignitible homogeneous fuel mixture for burning said homogeneous mixture in said chamber with operation of said spark-igniting means, during compression and expansion strokes burning said homogeneous mixture, and adjusting the flow rate of hydrogen with changes in demand for speed or power output from said engine while said flow of air remains substantially unthrottled.

2. A method in accordance with claim 1 including the step of inducing the flow of said hydrogen into said chamber at substantially ambient atmospheric pressure through paths of flow separated from paths for air flow to said chamber.

3. A method in accordance with claim 1 including the further step of raising the pressure of hydrogen to provide an increase flow rate for said hydrogen in response to an increased demand for power of speed.

4. A method in accordance with claim 1 including the further step of controlling the flow of hydrogen to each chamber by opening and closing valves formed from the motion of the valve train for said engine.

5. A method in accordance with claim 1 including the step of adding water, water vapor, or carbon dioxide to said hydrogen-fuel mixture to lower the temperature of the burning and thereby reduce the nitric oxide emissions from the engine exhaust.

6. A method in accordance with claim 1 including the further step of generating a hydrogen containing gas and passing any gaseous by-products from said hydrogen generating step including carbon dioxide gas through said hydrogen burning engine.

7. An internal combustion engine for burning a hydrogen air fuel mixture, said engine comprising in combination: a plurality of combustion chambers for receiving a homogeneous mixture of air and hydrogen therein, a piston movable in each of said combustion chambers during an intake of hydrogen-air, a compression of the hydrogen and air, a burning of the hydrogen-air fuel mixture, and exhaust of the resultant products of burning, means for burning said air fuel mixture in said combustion chamber during said compression and expansion strokes, an intake conduit means extending to each of said combustion chambers and for conducting the flow of said fuel mixture by induction on said intake strokes of said pistons, a supply means containing hydrogen connected to said intake conduit means to supply hydrogen to said intake conduit means, and control means for selectively regulating the flow of hydrogen from said supply means to said intake conduit means to vary the speed and power output of said engine, said varying of said hydrogen flow by said control means causing an inversely proportional change in the percentage of air in said fuel mixture and resulting in a substantially constant volume charge to said cylinders.

8. An internal combustion engine in accordance with claim 7 in which said hydrogen supply means stores hydrogen gas at a pressure above a predetermined level, and in which said control means includes a pressure regulator for reducing the pressure of hydrogen from said supply means to said intake conduit means.

9. An internal combustion engine in accordance with claim 8 in which said pressure regulating means provides hydrogen to said intake conduit means at a first pressure substantially equal to ambient atmospheric pressure and in which said control means further comprises means for providing an increase in pressure for the hydrogen gas flowing through said intake conduit means to provide a fast response for a demand for an increase in power or speed for said engine.

10. An internal combustion engine in accordance with claim 7 in which said intake conduit means comprises hydrogen intake tubes projecting to said combustion chambers and air intake pipes extending to said combustion chambers, said hydrogen intake tubes and said air intake pipes being separate and discrete from each other.

11. An internal combustion engine in accordance with claim 10 in which said air intake pipes each have a substantially smooth continuous wall defining a passageway extending from adjacent said cylinders to an open end thereby alleviating inefficiencies due to flow about sharp corners.

12. An internal combustion engine in accordance with claim 7 in which said intake conduit means comprises a first set of intake tubes for conveying hydrogen for light power and speed demands to said combustion chambers and a second set of intake tubes for conveying hydrogen to said combustion chambers for heavier power and speed demands.

13. An internal combustion engine in accordance with claim 7 in which said intake conduit means comprises a set of intake tubes for conveying hydrogen and distribution adjusting means are provided for regulating the flow and distribution of hydrogen through the respective ones of said tubes.

14. An internal combustion engine in accordance with claim 7 including a valve train means operatively associated with said combustion chambers, valves in said valve train associated with each of said combustion chambers to move between an open position allowing flow of hydrogen gas into its associated combustion chamber and a closed position preventing flow of hydrogen gas into its associated combustion chamber, and means in said valve train for opening and closing said valves in timed relationship to each other.

* * * * *